Patented Jan. 8, 1952

2,581,868

UNITED STATES PATENT OFFICE 2,581,868

N-(2-THENYL)-SUBSTITUTED ETHYLENE DIAMINES

Lucas P. Kyrides, St. Louis, Mo., assignor to Monsanto Chemical Company, St. Louis, Mo., a corporation of Delaware No Drawing. Application October 4, 1946, Serial No. 701,077

8 Claims. (Cl. 260—296)

This invention relates to new tertiary amines of heterocyclic compounds and more particularly to tertiary amines of the formula:

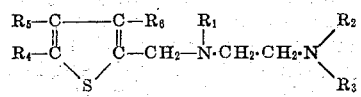

in which $R_1$ represents a radical selected from the group consisting of pyridyl and picolinyl radicals; $R_2$ represents a radical selected from the group consisting of hydrogen and alkyl radicals containing 1–3 carbon atoms; $R_3$ represents an alkyl radical containing 1–3 carbon atoms; $R_4$ represents a radical selected from the group consisting of hydrogen, chlorine, bromine, methyl and ethyl radicals; and $R_5$ and $R_6$ each represent a radical selected from the group consisting of hydrogen and methyl radicals. When $R_1$ is a pyridyl radical in the above formula, the respective isomeric pyridyl substituents, for example, the alpha-pyridyl, beta-pyridyl and gamma-pyridyl substituents are each contemplated as being within the scope of the present invention. When $R_1$ is a picolinyl radical in the above formula, the respective isomeric picolinyl substituents, for example, in the case of the beta-picolinyl radical, the alpha, alpha prime, beta prime and gamma substituents and in the case of the alpha-picolinyl radical, the alpha prime, beta, beta prime, and gamma substituents are contemplated as being within the scope of the present invention.

The compounds of the present invention in which $R_2$ and $R_3$ are ethyl, n-propyl or isopropyl radicals may be prepared, for example, by heating thenyl chloride or thenyl bromide with a benzene solution of an N—$R_1$-N',N'-dialkyl-ethylenediamine in which the alkyl radicals contain 2–3 carbon atoms and in which $R_1$ is a substituent of the type defined hereinabove.

The compounds of the present invention in which $R_2$ and $R_3$ are methyl radicals may be prepared by first preparing the monohydrochloride of an N—$R_1$-N',N'-dimethyl-ethylenediamine, for example, by refluxing a benzene solution of the diamine with an equivalent of ammonium chloride until evolution of ammonia ceases and subsequently heating the monohydrochloride slurry thus formed with thenyl chloride or thenyl bromide.

N-pyridyl-N',N'-dialkyl-ethylenediamines, N-picolinyl-N',N'-dialkyl-ethylenediamines and the corresponding N'-monoalkyl-ethylenediamines may be prepared, for example, by heating the appropriate amino pyridines or amino picolines with sodamide and the appropriate N-dialkyl-beta-chloroethylamine or N-monoalkyl-beta-chloroethylamine hydrochloride in a suitable solvent such as toluene.

The salts, for example, the mono-hydrochlorides, sulfates and phosphates, of the free base compounds are therepeutically active and are contemplated as being within the scope of the present invention. The salts may be prepared by any suitable method, for example, by adding the appropriate acid or acidic agent, or a solution thereof in a suitable solvent, such as ether or toluene, to a solution of the free base product in a suitable solvent. The salt is then recovered from the solvent.

The new compounds of the present invention are useful as therapeutic agents and more specifically as antihistaminic agents. The compounds found most desirable for this purpose at present are those in which the substituent $R_1$ is a pyridyl or a picolinyl radical, $R_2$ and $R_3$ are each methyl or ethyl radicals, and $R_4$, $R_5$, and $R_6$ are hydrogen.

The following examples serve to illustrate the invention without limiting it thereto.

Example I

To a slurry of sodamide in 200 cc. of toluene representing 6.7 grams of sodium was added at 30–40° C., 32.3 grams (0.31 mole) of 2-aminopyridine. The mixture was heated to reflux temperature and was refluxed for 1½ hours. To the resulting mixture was added over a period of approximately 1 hour a solution of 32 grams of freshly distilled N,N-dimethyl-beta-chloroethylamine in 40–50 cc. of dry toluene. The reaction mixture was then heated for 2 hours at reflux temperature. Thereafter, 200 cc. of water was added and the toluene layer was separated and washed with water. The toluene was stripped from the mixture by distillation and the residue was distilled under reduced pressure. The distillate was refractionated and the portion distilled at 93–103° C./1 mm. was recovered. Yield of N-(2-pyridyl)-N',N'-dimethyl-ethylenediamine, 60%.

A solution of 20 grams (0.121 mole) of N-(2-pyridyl)-N',N'-dimethyl-ethylenediamine in 25 cc. of toluene was added to a slurry of sodamide in 100 cc. of toluene representing 2.8 grams of sodium. The mixture was refluxed for one hour. To this mixture was added over a period of ½ hour a solution of 16 grams (0.121 mole) of 2-thenyl chloride in 25 cc. of toluene. The resulting reaction mixture was refluxed for three hours. Thereafter, water was added and the toluene layer was separated and washed with water. The toluene was then stripped off by distillation and the residue was distilled under reduced pressure. The main fraction was redistilled. Yield of N-(2-pyridyl)-N-(2-thenyl-N',N'-dimethyl-ethylenediamine having the formula:

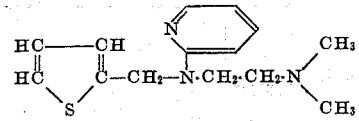

was 69%; boiling point 130–140° C./0.4 mm. A portion of the product was dissolved in ether and an ether solution of hydrogen chloride was added. The monohydrochloride of N-(2-pyridyl)-N-(2-thenyl)-N',N'-dimethyl-ethylenediamine which separated was washed with ether and dried.

Example II

The process of Example I was repeated using 32.3 grams of 3-amino-pyridine in place of 2-amino-pyridine in the preparation of N-(3-pyridyl)-N',N'-dimethyl-ethylenediamine. The product thus obtained was then reacted with 2-thenyl chloride in the manner described in Example I. A portion of the resulting product, N-(3-pyridyl)-N-(2-thenyl)-N',N'-dimethyl-ethylenediamine, was converted to the monohydrochloride salt by the procedure described in Example I.

Example III

The procedure of Example I was followed using 32.3 grams of 4-amino-pyridine in place of 2-amino-pyridine for the preparation of N-(4-pyridyl)-N',N'-dimethyl-ethylenediamine. This product was then reacted with 2-thenyl chloride according to the procedure of Example I for the preparation of N-(4-pyridyl)-N-(2-thenyl)-N',N'-dimethyl-ethylenediamine having the formula:

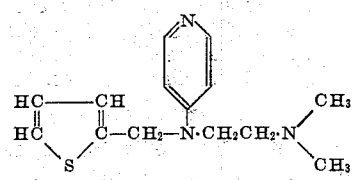

A portion of the resulting product was converted into the monohydrochloride by the procedure described in Example I.

Example IV

In place of 2-amino-pyridine in Example I, 33.5 grams (0.31 mole) of 2-methyl-3-amino-pyridine was employed for the preparation of N-(3-alpha-picolinyl)-N',N'-dimethyl-ethylenediamine. This product was then reacted with 2-thenyl chloride according to the procedure described in Example I for the preparation of N-(3-alpha-picolinyl)-N-(2-thenyl)-N',N'-dimethyl-ethylenediamine having the formula:

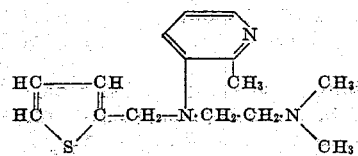

A portion of this product was converted to the monohydrochloride by the procedure described in Example I.

Example V

In place of 2-amino-pyridine in Example I, 33.5 grams of 2-amino-3-methyl-pyridine was employed in the preparation of N-(2-beta-picolinyl)-N',N'-dimethyl-ethylenediamine according to the procedure of Example I. The product was then reacted with 2-thenyl chloride according to the procedure of Example I for the preparation of N-(2-beta-picolinyl)-N-(2-thenyl)-N',N'-diethyl-ethylenediamine having the formula:

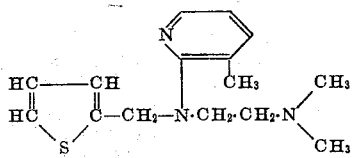

A portion of the resulting product was converted to the monohydrochloride by the procedure described in Example I.

Example VI

To a slurry of sodamide in 200 cc. of toluene representing 2.6 grams of sodium was added at 30–40° C. 32.3 grams of 2-amino-pyridine. The mixture was heated to reflux temperature and was refluxed for approximately 1½ hours. To the resulting mixture was added over a period of approximately one hour a solution of 28.8 grams of freshly distilled N-methyl-N-ethyl-beta-chloroethylamine hydrochloride in 40–50 cc. of dry toluene. The mixture was allowed to stand overnight. Thereafter, 200 cc. of water was added and the toluene layer was separated and washed with water. The toluene was stripped off by distillation and the residue was distilled under reduced pressure. The distillate was refractionated and the product, N-(2-pyridyl)-N'-methyl-N'-ethyl-ethylenediamine was recovered.

A solution of 20 grams (0.121 mole) of N-(2-pyridyl)-N'-methyl-N'-ethyl-ethylenediamine in 25 cc. of toluene was added to a slurry of sodamide in 100 cc. of toluene representing 2.8 grams of sodium. The mixture was refluxed for one hour. To this mixture was added over ¼ hour a solution of 16 grams (0.121 mole) of thenyl chloride in 25 cc. toluene. The resulting reaction mixture was refluxed for three hours. Thereafter water was added and the toluene layer was separated and washed with water. The toluene was then stripped off by distillation and the residue was distilled by reduced pressure. The resulting product was N-(2-pyridyl)-N-(2-thenyl)-N'-methyl-N'-ethyl-ethylenediamine having the formula:

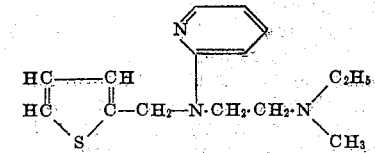

The monohydrochloride of this product was obtained according to the procedure of Example I.

In an analogous manner, the anti-histaminic agents of the present invention in which R₂ is hydrogen may be prepared, using an N-monoalkyl-beta-chloroethylamine, for example, N-mono-methyl-beta-chloroethylamine or N-mono-ethyl-beta-chloroethylamine in place of an N,N-dialkyl-beta-chloroethylamine such as N,N-dimethyl-beta-chloroethylamine or N,N-diethyl-beta-chloroethylamine.

I claim:

1. A compound from the group consisting of the tertiary amines having the formula:

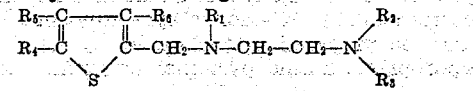

wherein $R_1$ represents a radical from the group consisting of pyridyl and picolinyl radicals, $R_2$ represents a radical from the group consisting of hydrogen and alkyl radicals containing 1-3 carbon atoms, $R_3$ represents an alkyl radical containing 1-3 carbon atoms, $R_4$ represents a radical from the group consisting of hydrogen, methyl and ethyl radicals and $R_5$ and $R_6$ each represents a radical from the group consisting of hydrogen and methyl radicals, and the acid salts thereof.

2. The anti-histaminically active tertiary amine of the formula:

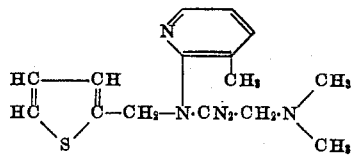

3. The anti-histaminically active tertiary amine of the formula:

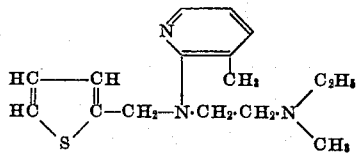

4. The anti-histaminically active tertiary amine monohydrochloride salt of the formula:

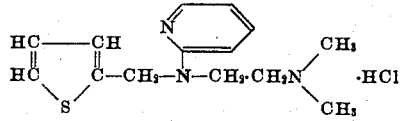

5. An acid salt of the tertiary-amine N-(a pyridyl)-(a thenyl)-N',N' dimethylethylenediamine represented by the formula:

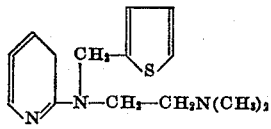

6. A method of preparing N,N-dimethyl-N'-2-pyridyl-N'-2 thenyl-ethylenediamine which comprises mixing together and heating a 2-thenyl halide and an alkali metal salt of N,N-dimethyl-N'-2-pyridyl-ethylenediamine.

7. An acid salt of the tertiary amine of the formula:

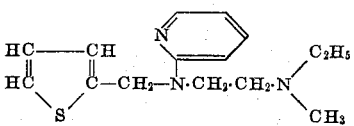

8. A mono-hydrochloride salt of the formula:

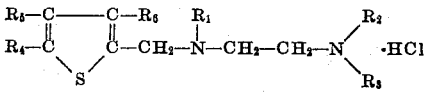

wherein $R_1$ represents a radical from the group consisting of pyridyl and picolinyl radicals, $R_2$ represents a radical from the group consisting of hydrogen and alkyl radicals containing 1-3 carbon atoms, $R_3$ represents an alkyl radical containing 1-3 carbon atoms, $R_4$ represents a radical from the group consisting of hydrogen, methyl and ethyl radicals and $R_5$ and $R_6$ each represents a radical from the group consisting of hydrogen and methyl radicals.

LUCAS P. KYRIDES.

REFERENCES CITED

The following references are of record in the file of this patent:

UNITED STATES PATENTS

| Number | Name | Date |
|---|---|---|
| 1,757,394 | Schulemann | May 6, 1930 |
| 2,406,594 | Djerassi | Aug. 27, 1946 |

OTHER REFERENCES

George Richter: "Organic Chemistry," Wiley, 1938, pp. 649, 650.

Alles: Jour. of Pharmaceutical and Experimental Therapy, 72,265, (1941).

J. Amer. Chem. Soc. 69, 2239, 2240 (September 1947).

American Journal of Pharmacy, October 1947, p. 380.

Jour. of Laboratory and Clinical Medicine, 32, pp. 137 to 1373 (November 1947).